United States Patent Office 2,757,959
Patented Aug. 7, 1956

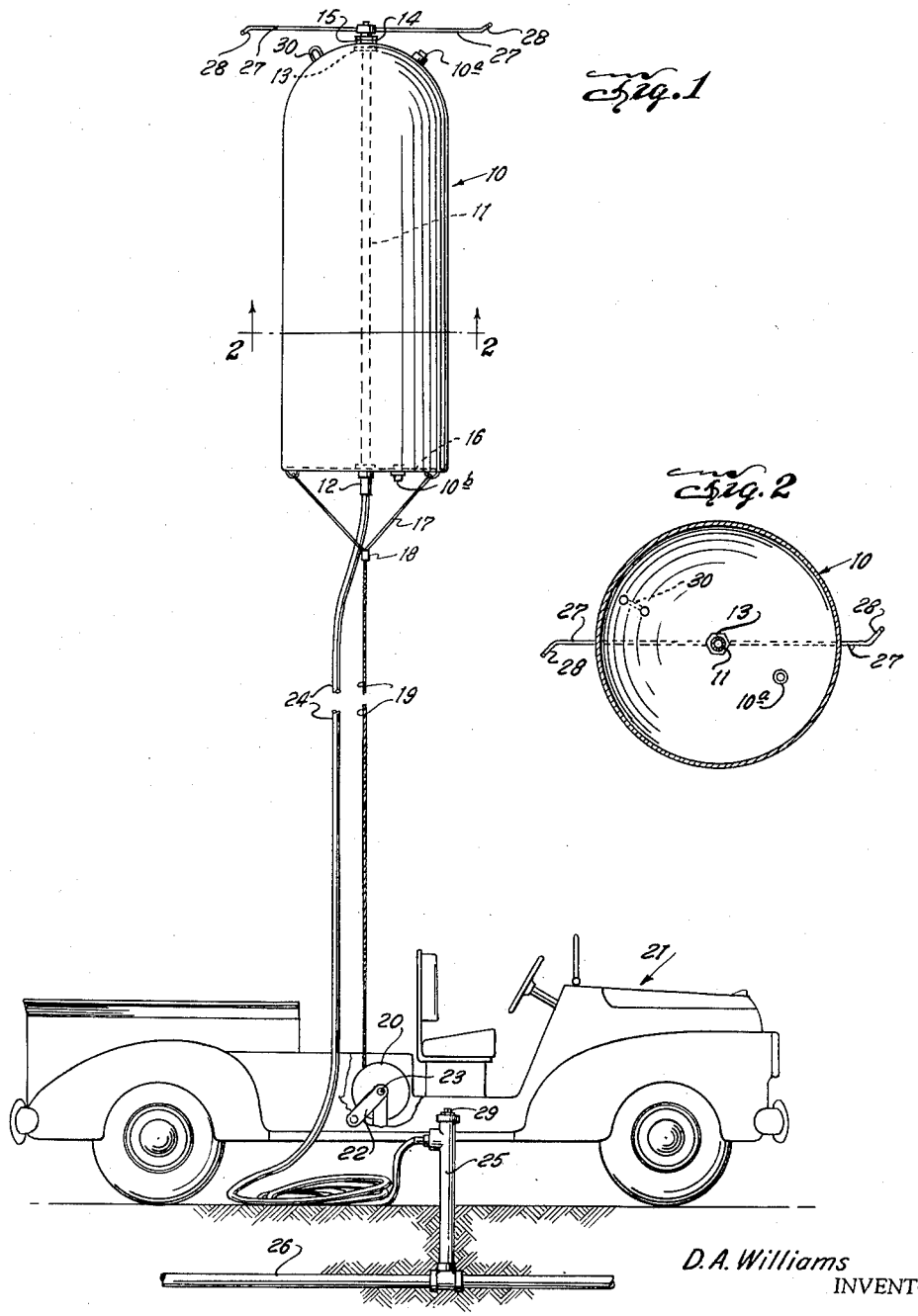

2,757,959

AERIAL IRRIGATING APPARATUS

David A. Williams, Texarkana, Tex.

Application March 21, 1955, Serial No. 495,703

1 Claim. (Cl. 299—47)

This invention relates to farm irrigation equipment and more particularly to an aerial irrigation apparatus.

It is the current practice in certain regions to pipe irrigation water into fields from nearby lakes, rivers or other water sources and provide hydrants in appropriately spaced relationship throughout the area to be irrigated. Water from these hydrants may be distributed by means of irrigation canals or water distributing spray heads through lengths of hose. These methods of irrigation have been employed for many years but it is desirable that an irrigation system be provided which will distribute water more evenly over a wider area with minimum labor and at a considerable saving in time.

The principal object of the invention therefore, is to provide apparatus for aerial irrigation which includes a cylindrical captive balloon filled preferably with helium because of its uninflammable characteristics and superior lifting power, and equipment by which water may be passed upwardly through the longitudinal axis of the balloon and released at the top thereof under pressure by means of a rotary spraying device which distributes the water over a wide circular area.

Another object of the invention is to provide a winch mounted either on the ground adjacent an outlet from the underground water supply system or on a vehicle by which the balloon is held captive at any desired height permitted by the flexible water supply hose connected between the water supply outlet and a pipe extending axially through the balloon and carrying the rotary spray device.

Still another object of the invention is to provide aerial means of the character set forth which may find use not only for irrigation purposes but also for extinguishing fires where other means is not available for applying water or liquid chemicals from an elevated position above the blaze to extinguish the same.

Other objects will appear as the description proceeds when considered with the annexed drawing wherein:

Figure 1 is an elevational view of the invention showing a truck carrying a winch for holding the balloon captive, and Figure 2 is a sectional view of the balloon taken on line 2—2 of Fig. 1.

Continuing with a more detailed description of the drawing, reference numeral 10 denotes broadly a gas bag or balloon, the material of which it is made being rubberized cloth, plastic or even aluminum if the latter is found to be suitable. The balloon is preferably of elongate cylindrical shape and contains helium as the lifting medium. A pressure relief valve 10a is provided on the upper end of the balloon. Also, a gas inlet valve 10b is located in the bottom of the balloon.

Extending axially through the cylindrical bag 10 is a water pipe 11 which may be either metal or plastic, rigid or flexible and which is anchored at one end of the bag 10 by means of a fitting 12, providing a swivel connection for a hose 13 and at the opposite end of the bag by means of a seal composed of internal and external nuts 13 and 14, respectively, threaded onto the upper end of the tube 11 with interposing washers 15 to prohibit gas leakage at this point.

Should the bag 10 be made of flexible material, it is preferred that a base plate 16 of metal be fixed in its lower end to provide suitable rigidity thereof for the attachment of a cable or rope bridle 17 to which, in turn, is attached at 18 the rope or cable 19 made or woven of light material. The cable 19 is wound on a winch 20 which is actuated either by power supplied by a truck 21 or by manually operating a crank 22 attached to the winch shaft 23. The winch may be of any well known manufacture, equipped with the customary ratchet control mechanism, not shown.

Attached to the connection 21 is one end of a hose 24 made preferably of light plastic and is of a length which predetermines the height to which the balloon is to ascend and the opposite end of the hose is connected to a hydrant 25 of which there may be several throughout the area to be irrigated and supplied by water from a source conveyed by a system of pipes 26, usually underground.

The vehicle 21 may be of any type, including a trailer or other inexpensive means serving to both transport the balloon between storage and field and to provide anchorage for the balloon in the field so that it will not be released to free flight and thus endanger air traffic. A manually actuated winch such as indicated at 20 on the truck 21 may also be anchored to the ground adjacent each hydrant 25 to hold the balloon captive and the vehicle used for moving the balloon from one hydrant to another in the field.

Mounted rotatably on the upper end of the axially extending water tube 11 is a water spray device consisting preferably of two or more radially extending arms 27 whose curved ends 28 supply jet action effective to propel the arms under pressure of water ejected from the curved ends of the spray device, thus to spread the water over a wide, circular area. Pump pressure is supplied at the point where water enters the supply pipes 26.

When it is desired to irrigate a given area, the balloon 10 is hauled to the area on the truck 21 and the hose 24 is attached to the coupling 12 of the balloon. The winch 20 is actuated to unwind the cable 19 therefrom until the balloon reaches the desired height. The valve 29 of the hydrant 25 is actuated to permit water to pass upwardly through the hose 24 and tube 11 and outwardly through the spray arms 27.

When the irrigating operation is completed, the balloon is reeled in by the winch and another cable, not shown, is attached to a loop 30 on the upper end of the balloon in order that the latter may be restrained on the truck 21 when it is desired to move the balloon to another hydrant for further irrigation.

It is evident also from the foregoing that the described apparatus may be used to considerable advantage in extinguishing fires where it is desirable to spray or play water downwardly onto a blaze.

Manifestly, the construction as shown and described is capable of some modification and such modification as may be construed to fall within the scope and meaning of the appended claim is also considered to be within the spirit and intent of the invention.

What is claimed is:

An aerial water distributing apparatus comprising a bag of elongate cylindrical shape containing lighter-than-air gas, a circular metal plate forming the bottom of said bag, a gas pressure relief valve in said plate, a gas inlet valve in the top of said bag, a water tube extending axially through plate and said bag and connected at its ends in sealing engagement with the plate and the upper end of said bag, a rotary spray device mounted on the upper end of said tube, a hose connected at one end to the lower end of said tube and at its opposite end to a source of water under pressure, a bridle attached to said plate, a ground winch and flexible means carried by said winch and connected to said bridle for holding said bag captive while water is passed upwardly through said hose and tube and outwardly through said spray device.

References Cited in the file of this patent

UNITED STATES PATENTS

| | | |
|---|---|---|
| 426,169 | Chapman | Apr. 22, 1890 |
| 1,746,575 | Barner | Feb. 11, 1930 |